Dec. 2, 1969  E. E. HEWITT  3,481,803
FRICTION WELDING
Filed Oct. 19, 1966
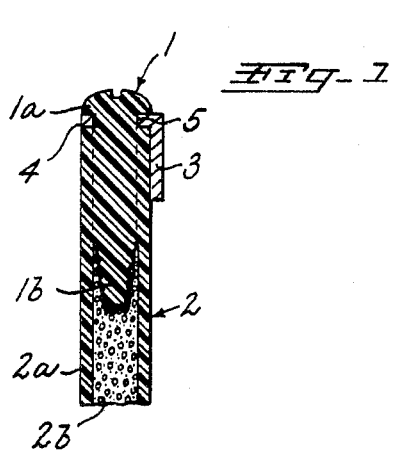
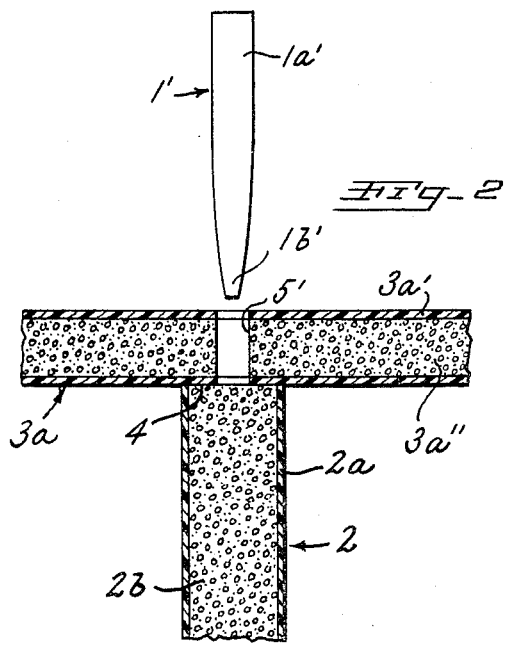
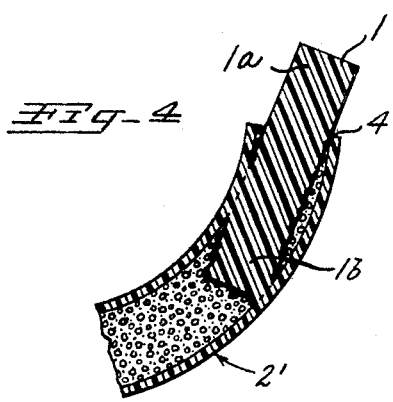
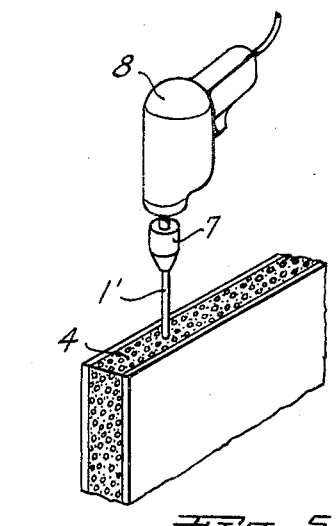
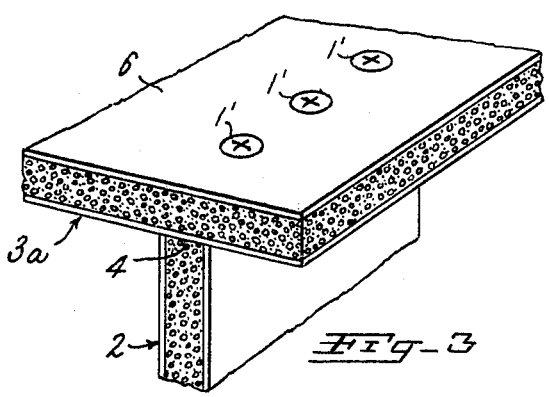
INVENTOR
EUGENE E. HEWITT
BY
ATTORNEY

United States Patent Office 3,481,803
Patented Dec. 2, 1969

3,481,803
FRICTION WELDING
Eugene E. Hewitt, Walkerton, Ind., assignor to Uniroyal, Inc., New York, N.Y., a corporation of New Jersey
Filed Oct. 19, 1966, Ser. No. 587,848
Int. Cl. B32b 5/18
U.S. Cl. 156—73
8 Claims The present invention relates to friction welding and more particularly to the friction welding of a fastener member to a member of thermoplastic material.

While at the present time there are known various methods for welding a thermoplastic member to another member and for mounting articles on a thermoplastic sheet, the known methods suffer from various disadvantages. These known methods include, for example, solvent welding, or the use of various cements, bolts, screws, etc., all of which cause great inconvenience and costs in the fabricating and assembly of structures. In fact, in many cases it is impossible from an economic or engineering standpoint to fabricate structures according to these known methods.

It is accordingly a primary object of the present invention to provide an improved method of mounting articles on a member of thermoplastic material.

In particular, it is an important object of the present invention to provide a method of this type which requires a minimum amount of materials and equipment for practicing the method and which from the economic and engineering standpoint is completely satisfactory and practical in every way.

It is another object of this invention to provide a method where the materials and equipment required to practice the method are inexpensive and readily available.

A further object of this invention is to provide an improved method of mounting articles on the exposed edge portions of sheets of expanded-core-type thermoplastic material.

A concomitant object of this invention is to provide an improved method of connecting, at substantially right angles, a pair of expanded-core-type thermoplastic sheets.

Also, the objects of the present invention include the provision of a method which makes it possible to fixedly connect an elongated fastener member endwise to the exposed edge portion of expanded-core-type thermoplastic sheet without pre-drilling of the sheet material.

Further objects and advantages of this invention will become apparent as the following description proceeds.

While the specification concludes with claims particularly pointing out and distinctly claiming the subject matter of this invention, it is believed that the invention will be better understood from the following description, taken in conjunction with the accompanying drawings, in which:

FIG. 1 is a fragmentary transverse sectional elevation of a thermoplastic fastening member joining a metallic article to the exposed edge face of a thermoplastic sheet of the expanded-core-type;

FIG. 2 is a fragmentary transverse sectional elevation illustrating an intermediate stage of the right angle joinder of a pair of thermoplastic sheets of the expanded-core-type;

FIG. 3 is a perspective view of the structure of FIG. 2 after completion of the method according to the invention;

FIG. 4 is a transverse sectional elevation fragmentarily illustrating a thermoplastic fastening member welded, according to the method of the present invention, to the exposed edge portion of a curved sheet of thermoplastic material of the expanded-core-type; and FIG. 5 is a perspective schematic representation of the method of the present invention.

Referring to the figures, wherein like parts have like numbers in the various views, it will be seen that the method of the present invention involves the use of rod-shaped elongated thermoplastic fastening members 1, 1'. The thermoplastic fastener member 1 has a head portion 1a, provided with an operating means such as a screwdriver slot or a Phillips head groove, while the operating means of the fastening member 1' takes the form of an axial extension which may be gripped by the jaws of a chuck 7 as shown in FIG. 5. Extending from the head portion of the fastening member 1, is an elongated tapered second portion 1b. It should be noted however both with respect to members 1 and 1' that the taper of such second portion is not essential to the practice of the present invention, i.e., the portion 1b and 1b' may be cylindrical.

Referring now to FIG. 1 there is shown a first thermoplastic member or sheet of thermoplastic material 2 on which it is desired to mount an article, for example an extruded aluminum molding 3, in such a manner that the molding 3 covers the exposed edge 4 of the sheet 2 of expanded-core thermoplastic material. The latter sheet is, of course, composed of a central expanded core 2b sandwiched between a pair of relatively thin parallel side layers or walls 2a. It is well known that in such sheet construction the core is substantially less dense than the wall portions.

Each fastener member is in the form of a single unitary body of thermoplastic material, and these fastener members are inexpensively manufactured in any suitable way, such as by molding from granular plastic material. The fastener members are preferably of substantially denser composition than the expanded core portions of the sheets and more closely resemble in density the composition of the unexpanded side layers or walls.

As illustrated in FIG. 1, the article 3 which it is desired to connect to the thermoplastic sheet 2 is provided with openings 5 having a diameter substantially equal to the spacing between the interior surfaces of the layers or walls 2a. Similarly, the second portion 1b of the fastener member 1 includes a portion which has a diameter also approximately equal to the distances between the interior surfaces of the pair of parallel walls 2a but nevertheless capable of passing through the opening 5.

In practicing the method of the invention the sheet material 2 is placed on any suitable support with the edge face 4 exposed. The article 3 in the form of an extruded L-shaped molding is next placed with one of its two flanges covering the exposed edge face 4. Article 3 is provided with an opening 5 in the region of the core portion of the exposed edge face 4. The second flange of the L-shaped article 3 overlies portions of a side face of member 2 and thus serves to support the member 3 against rotation with respect to the sheet 2 during the remainder of the operation. With the article 3 in the foregoing position with respect to the edge portion of member 2, the stem 1b of thermoplastic fastening member 1 is guided through the opening 5 and into engagement with the exposed core portion of the edge face 4. The axis of the elongated member 1 is maintained substantially normal to the plane of the exposed face 4 during the application of a power operated screwdriver to the operating portion of head 1a. The driving member of the screwdriver is then rapidly rotated about its axis so that the fastening member 1 is spun with respect to the sheet member 2 and the article 3. Simultaneously with this spinning of the fastening member with respect to the sheet member and the article, the fastening member 1 and the sheet member 2 are pressed against each other in axial direction of the fastening member 1 urging the fastening member to penetrate the sheet member 2 endwise in such axial direction. Thus, the fastening member 1 is urged, under pressure, to penetrate the core portion 2b located between the pair of spaced walls 2a. The frictional spinning of the fastening member 1 with respect to the sheet material creates between the fastening member and the sheet material a heat which is sufficient to melt the thermoplastic material of the fastening member as well as the thermoplastic material of the sheet material where the material of the fastening member stem portion 1b and the sheet material portions engage each other, to create a layer of molten thermoplastic material directly beneath the spinning member and into which the fastening member progressively enters as a result of the pressure between the sheet material portions, on the one hand, and the fastening member, on the other hand. As a result, during the continued spinning of the fastening member the latter will progressively penetrate into the body of the sheet material with the layer of molten thermoplastic material circumferentially spreading along the exterior surface of the stem portion 1b of the fastening member. Since portions of the stem 1b have a diameter closely approximating the distance between the internal surfaces of the opposite spaced walls 2a, the melting of the thermoplastic material will extend into the region of the unexpanded substrate layers or side walls 2a so that interior surface portions of these layers, in the region of the fastening member 1, will also be reduced to a molten state.

This operation is continued until, for example, the underside of the head portion 1a of fastening member 1 engages the upper face of article 3, as illustrated in FIG. 1, and then the spinning of the fastening member is terminated while the latter remains in the position to which it has progressed and the molten plastic cools and sets, thus fusing the thermoplastic sheet material portions and the fastening member to each other to provide the structure shown in FIG. 1. As may be seen from FIG. 1, the fastening member 1, as well as the sheet material portions 2a, 2b are all fused together to form a unitary welded structure with part of the circumferential portions of the stem 1b of the fastening member having melted together with and become integral with the sheet material portions 2a and 2b.

When these operations are completed for the fastener 1 of FIG. 1 these operations may then be carried out for additional fasteners spaced along the length of the molding 3.

It will be noted that no pre-drilling of member 2 is required according to the method of the present invention since the relative pressure and spinning between the members 1 and 2 suffices to cause a deep penetration of elongated member 1 into and welding with the material of member 2.

As shown in FIGS. 2 and 3, a pair of expanded-core-type thermoplastic sheets 2 and 3a may be joined together in a somewhat similar manner. In this procedure the thermoplastic sheet 3a constitutes the article being connected or joined to the first thermoplastic sheet 2. The expanded-core-type thermoplastic sheets are joined at right angles with the exposed edge face of one sheet 2 abutting a side face of the second sheet 3a. In order to practice the method illustrated in FIG. 2, a transverse opening 5' is first formed in sheet member 3a by any suitable means, such as punching, drilling, etc. Thus, there is provided a bore which is substantially normal to the parallel side faces of the sheet 3a. The bore 5' preferably has a diameter at least 5–10% smaller than the diameter of the fastener member 1' to be used in conjunction therewith. Unitary fastener member 1' is identical in all respects with the previously described fastener member 1 illustrated in FIG. 1 except that fastener member 1' is formed in the shape of a substantially cylindrical rod having a second portion 1b' which may, but need not, be tapered. This rod includes an operating portion 1a' which is adapted to be held by the jaws of a chuck. It is preferred to use a chuck of the type known as "Wahlstrom—fully automatic chuck—instant change," manufactured by the AMF Company. The latter type of chuck permits quick release of the fastening member for terminating the spinning thereof. FIG. 2 illustrates a fastener member 1' prior to entry thereof into the hole 5' of member 3a. After the operation is completed, the portion of the member 1' which was held in the chuck and therefore projects from the top face of member 3a may be ground flush therewith.

With the sheet member 2 and the sheet 3a held, by any suitable holding means, in the perpendicularly abutting position illustrated in FIG. 2, and with the bore 5' being located in the region of the expanded core layer 2b of sheet 2, the fastener member 1' is rapidly spun in the manner previously described with respect to the method illustrated in FIG. 1, and, also as previously described, is simultaneously pressed axially into the bore 5' and toward the sheet member 2. Alternatively, of course, the fastener 1' may be rotated in place and the members 2 and 3a advanced in axial direction of the fastener so as to cause the latter to penetrate and enlarge the bore 5' and finally to enter into the expanded core material 2b.

The frictional spinning of the fastener 1' with respect to the smaller diameter inner surface portion of the bore 5', creates between the fastener and the surface portions defining the bore 5' a heat which is sufficient to melt the thermoplastic material of the fastener as well as the thermoplastic material surrounding the bore 5' where these materials engage each other, to create a layer of molten thermoplastic material surrounding the spinning fastener member and permitting the latter to progressively enter the previously smaller bore as a result of the pressure between the fastener member, on the one hand, and the sheet member 2 on the other hand. As a result, during the continued spinning of the fastener the latter will progressively enter into the bore 5', melting the walls of the latter and thereby increasing the diameter thereof. Meanwhile the leading tip portion 1b' of the fastener member will progressively enter, in the manner previously described, the expanded core portion 2b. It will be noted, in this connection, that according to the method illustrated in FIG. 2 the stem portions entering the member 2 may have a diameter which is smaller than the distance between the non-expanded substrate wall portions or layers 2a so that a direct welding of the fastener member to these wall portions need not result.

While the method has been described with respect to a single fastener member 1' it will be clear that, as seen in FIG. 3, a plurality of spaced fastener elements may be applied in the same manner by repeating the process described above. As seen in FIG. 3, the protruding fastener head portions 1a' are ground flush with the surface 6 of the sheet 3a and since the fasteners 1' are preferably of the same material as the material of surface 6 it is possible to apply the identical treatment, finish, etc., to the fastener head portions as is applied to all of the remaining portions of surface 6.

The above described method, it will be noted, also enables the joining element, i.e., the fastening member to be made of the same material as the base sheet thereby providing a joint having a coefficient of expansion basically that of the sheet material and having a surface which has the same receptivity to paints, and other finish coatings as is found in the base sheet.

According to the method exemplified by the embodiment illustrated in FIG. 4, a fastener member 1 may be friction welded, in the same manner described hereinabove with reference to FIG. 1, onto a curved thermoplastic expanded-core-type panel 2'. Thus, a fastener member 1 may be urged axially in a direction transverse to the plane of the exposed edge face 4 of a curved panel 2' and may be spun welded thereto in the manner previously described and as indicated in FIG. 4. It should be also noted with respect to FIG. 4 that the method of the invention may be practiced without applying the fastening member through an opening or bore in an article so long as the fastening member is provided with a fastening portion, for example head 1a', to which an article may later be connected. Thus, for example, a flexible plastic sheet having an opening corresponding to head 1a may at any time be fitted over the head 1a' of fastener member 1 when the latter is welded in the position illustrated in FIG. 4. Also, where a curved sheet 2' is used, the fastener may have a diameter smaller than the distance between the sidewalls 2a and still, because of their curvature, be welded directly to interior surface portions of the latter as seen in FIG. 4.

The pressure with which the sheet material portions and the fastener members are urged toward each other need not be very great and can be easily applied by the average individual. Thus, as is indicated in FIG. 5, all that is required to practice the method of the invention is to place the driving member of a power drill, for example a ¼″ hand drill, into engagement with the operating portion of the head of the fastening member and then, with proper manual guiding of the fastening member and pressure applied in the direction indicated, it is possible to practice the method of the invention. Also, the heat generated is concentrated substantially at the interface of the two components and is normally rapidly dissipated so as to make it readily possible for the operator to hold his hands relatively close to the spinning fastener member for properly guiding the same, since there is normally little or no rise in the temperature of the sheet or fastener member. Where a straight, i.e., cylindrical rod fastener is used, a hand drill equipped with a quick release chuck may be used.

The term "thermoplastic," as used herein, means or refers to materials which become soft and pliable when heated, without any change in inherent properties of the material. It is intended to include, without limitation thereto, resins such as: Acrylonitrile-butadiene-styrene (ABS), polyvinyl chloride (PVC), whether plasticized or unplasticized; copolymers of vinyl chloride and copolymerizable monomers thereof (plasticized); fused highly plasticized polyvinyl chloride or vinyl chloride copolymers (fused pastisols); blends of vinyls and ABS; polyethylene (PE); polypropylene (PP); styrene-acrylonitrile copolymers; polystyrene; copolymers of styrene and such copolymerizable monomers as alpha methyl styrene; polystyrene blended with butadiene-styrene rubbery copolymers (high impact styrenes); polymethyl methacrylate esters and acrylic resins in general, including thermoplastic polymers or copolymers of acrylic acid, methacrylic acid, the esters of these acids such as the methyl, ethyl and butyl esters, or acrylonitrile; acetal resins such as those made by polymerizing formaldehyde; polycarbonate resins (PC) such as those produced by reacting bisphenol A and phosgene; polyamide resins known as nylons; and polymerized fluorinated hydrocarbons such as polytetra-fluoroethylene (TFE).

The invention can be employed where the thermoplastic material of the sheet member or members and of the fastener member are each of the same kind of thermoplastic resin, and it can also be employed where the materials are different kinds of thermoplastic resins which are compatible with each other. Examples of resins which are compatible and will bond to one another using friction welding techniques are shown in the compatibility chart below. An "X" at the intersection of the horizontal and vertical column indicates the resins concerned which bond to one another using friction welding techniques. An "O" indicates the resins concerned which will not so bond to one another.

COMPATIBILITY CHART

|  | ABS | TFE | Acetal | Nylon | PVC | Acrylic | PE | PP | PC |
| --- | --- | --- | --- | --- | --- | --- | --- | --- | --- |
| ABS | X | O | X | X | X | X | O | O | O |
| TFE | O | X | O | O | O | O | O | O | X |
| Acetal | X | O | X | O | X | X | O | O | O |
| Nylon | X | O | O | X | X | O | O | O | X |
| PVC | X | O | X | X | X | X | O | O | X |
| Acrylic | X | O | X | O | X | X | O | O | X |
| PE | O | O | O | O | O | O | X | X | O |
| PP | O | O | O | O | O | O | X | X | O |
| PC | X | O | O | X | X | X | O | O | X |

U.S. patents, No. 2,439,202, No. 2,600,024 and No. 3,018,268, all assigned to the assignee of the present invention, describe suitable thermoplastic compositions which can be used in making either the sheet material portions or the fastener members. U.S. patents, No. 3,041,220, No. 3,070,817 and No. 3,206,354, all assigned to the assignee of the present invention, describe cellular cored, i.e., expanded-core-type, products, generally referred to as ABS expanded sheet materials, on which the present invention can be advantageously employed.

While the fasteners of the invention can be of any size and can be used with thermoplastic sheets of any thickness, the invention has been successfully practiced with fasteners which have a length of the order of one inch, a diameter on the order of ¼ inch and where the thickness between the faces 2a of the sheet member was also on the order of ¼ inch. These dimensions are only illustrative.

While the invention can be practiced with any combination of compatible materials as indicated in the above chart, it is also possible to practice the invention with fasteners of relatively stiff, non-thermoplastic materials having a roughened surface, while using one of the thermoplastic materials listed above for the sheet material. Materials of the thermosetting type such as cured epoxy, may also be used for the fastener member, provided the temperature at which the material is degraded is above the temperature to which the fastener member will be exposed during the friction welding process.

Metal fastener elements can also be employed with success. These, may either have smooth or roughened external surfaces with which the thermoplastic material can unite mechanically to securely hold the fastener.

It is of course also possible to practice the method of the invention with a fastener member as described above in conjunction with a cellular thermoplastic material of a shape other than a sheet of the expanded-core-type. Thus, for example, a fastener member may be readily connected to a block of cellular material in the manner described above for sheets. While, for the sake of simplicity, the invention has thus far been described with reference to an elongated fastener member, it is of course possible also to practice the invention with a fastener member of say, cylindrical shape, and having a diameter which exceeds its length. Thus, it is necessary only that the fastener member have a shape which has an axis of symmetry about which the fastener may be spun, and a sufficiently large dimension along this axis of symmetry to permit substantial axial penetration of the fastener member into a second thermoplastic member.

The term "fastener member" as used herein is intended to include any member which itself may be directly fastened to another member and is not intended to be limited to a member used to fasten two other members together.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described my invention, what is claimed as new and desired to be protected by Letters Patent is:

1. In a method of connecting a thermoplastic fastening member to an expanded-core-type thermoplastic sheet member, the steps of placing said sheet member and said fastening member into engagement, with an axis of symmetry of said fastening member located substantially normal to an exposed edge face of said sheet member; pressing said members against each other in a direction to penetrate said sheet edgewise with said fastening member while simultaneously spinning said elongated fastening member about said axis and with respect to said sheet member at a speed sufficient to frictionally create between said members a temperature which will melt the material of said members where they frictionally engage each other, so that during the spinning of said fastening member with respect to said sheet the pressure of said sheet and fastening member against each other will progressively displace said fastening member into said sheet member; and terminating the spinning of said fastening member with respect to said sheet member after said fastening member has progressed a given extent into said sheet member, so that thereafter the molten material of said members will solidify and said fastening member will become fixedly joined to said sheet member.

2. In a method as recited in claim 1, further comprising the steps of placing an article formed with an opening adjacent said exposed edge face of said sheet member and passing a portion of said fastening member through said opening into engagement with the edge face of said sheet member, said fastening member having an article engaging portion for retaining said article with respect to said sheet member after said fastening member is joined to said sheet member.

3. In a method as recited in claim 2, wherein said fastening member resembles a threadless screw, said article being plate-like and said fastening member having an article engaging head portion whose diameter exceeds the diameter of said opening.

4. In a method as recited in claim 2, wherein said article comprises a sheet of expanded-core-type thermoplastic material, the steps of forming in said article a transverse bore extending between opposite side faces thereof and having a diameter smaller than the diameter of a portion of said fastening member, placing said article and said sheet member together with one side face of said article overlying said exposed edge face of said sheet member, passing said portion of said fastening member into said bore when said members are pressed against each other, and holding said article against rotation so that said fastener member will spin with respect also to said article at a speed which is sufficient to frictionally create between said fastening member and said article sufficient heat to melt the material of said fastener member and said article where they frictionally engage each other, whereby during such spinning said portion of said fastener member will be progressively displaced by said pressure between said members through said article before penetrating said sheet member, that portion of said fastening member remaining within said article after termination of spinning will thus be welded to said article upon cooling of the molten material simultaneously with the welding of said fastening member to said sheet member.

5. In a method as recited in claim 1, wherein said fastening member is elongated and comprises a substantially solid rod-shaped piece of thermoplastic material and said sheet member is formed of an expanded core of thermoplastic material sandwiched between a pair of substantially parallel wall portions, maintaining said spinning and said pressure until a substantial portion of said fastening member has penetrated axially into said expanded core material of said sheet member.

6. In a method as recited in claim 4, where the diameter of said portion of said fastening member is substantially equal to the distance between said parallel walls so that the fastening member will be at least partially joined directly to said walls.

7. In a method as recited in claim 1, the properties of the material of said thermoplastic sheet member and said fastening member being substantially identical.

8. In a method of connecting a fastener member to an expanded-core-type thermoplastic sheet member, the steps of placing said members with an end portion of said fastener member adjacent a face of said sheet member; pressing said members against each other in a direction parallel to an axis of symmetry of said fastener member while simultaneously spinning said fastener member about said axis at a speed sufficient to frictionally create between said members a temperature which will melt the material of said sheet member in the region of engagement thereof with said fastener member, so that during the spinning of said fastener member with respect to said sheet member the pressure of said members against each other will progressively displace said fastener member in the direction of said axis into said sheet member; and terminating the spinning of said fastener member with respect to said sheet member after said fastener member has penetrated a given extent into the material of said sheet member so that thereafter the molten material will solidify in union with the portion of said fastener member located within said sheet member and said fastener member will become fixedly joined to said sheet member.

References Cited

UNITED STATES PATENTS

| 2,169,315 | 8/1939 | Yngue | 156—73 |
| 2,942,748 | 6/1960 | Anderson | 156—73 |
| 2,989,107 | 6/1961 | James | 156—92 |
| 3,184,353 | 5/1965 | Balamuth | 156—92 X |

FOREIGN PATENTS

| 1,013,503 | 12/1965 | Great Britain. |

CARL D. QUARFORTH, Primary Examiner

A. J. STEINER, Assistant Examiner

U.S. Cl. X.R.

156—92, 306